United States Patent [19]

Schievelbein

[11] Patent Number: 6,007,702
[45] Date of Patent: Dec. 28, 1999

[54] PROCESS FOR REMOVING WATER FROM HEAVY CRUDE OIL

[75] Inventor: Vernon H. Schievelbein, Katy, Tex.

[73] Assignee: Texaco Inc., White Plains, N.Y.

[21] Appl. No.: 09/083,177

[22] Filed: May 22, 1998

[51] Int. Cl.$^6$ .......................... C10G 33/00; C10G 33/04; B01D 17/04; B01D 17/00
[52] U.S. Cl. .......................... 208/188; 208/187; 252/328; 252/358
[58] Field of Search .................................. 208/187, 188; 252/328, 358

[56] References Cited

U.S. PATENT DOCUMENTS

| | | |
|---|---|---|
| 3,591,520 | 7/1971 | McDonald . |
| 4,002,558 | 1/1977 | Feldman ................................. 208/188 |
| 4,466,885 | 8/1984 | Ronden . |
| 4,551,239 | 11/1985 | Merchant et al. . |

FOREIGN PATENT DOCUMENTS

| | | |
|---|---|---|
| 0 505 169 | 9/1992 | European Pat. Off. . |
| 2 645 047 | 10/1990 | France . |
| 76 467 | 5/1970 | German Dem. Rep. . |
| 291 568 | 7/1991 | German Dem. Rep. . |

OTHER PUBLICATIONS

Berger, et al., SPE Production Engineering, "Designing and Selecting Demulsifiers for Optimum Field Performance on the Basis of Production Fluid Characteristics," (Nov. 1988) 522–526.
Jones, et al., Journal of Canadian Petroleum Technology, "Water–in–Crude Oil Emulsion Stability and Emulsion Destabilization by Chemical Demulsifiers," (Apr.–Jun. 1978) 100–108.
JPT, "Completion Optimization in the Black Warrier Basin," (Sep. 1997) 994, 997.
McClean, et al., Journal of Colloid and Interface Science, "Effects of Asphaltene Solvency on Stabiligy of Water–in––Crude Oil Emulsions," (1997) 189 242–253.
Tambe, et al., Journal of Colloid and Interface Science, "Factors Controlling the Stability of Colloid–Stabilized Emulsions," (1995) 171 463–469.
Vygorovskii, et al., "Properties of Petroleum Recovered by Thermal Akali Flooding," Probl. Khim. Nefti (1992) 164–169 (Russian).
Wasan, "Destabilization of Water–in–Oil Emulsions," Emulsions—A Fundamental and Practical Approach (J. Sjoblom, Ed.) (1992) 283–295.
Caplus Abstract of Gohlke et al., "Evaluation Criteria and Action of Petroleum Demulsifiers," Tr–Mzhdunar. Kohgr. Poverkhn.–Akt. Veshchestvam, 7$^{th}$ (1978), Meeting Date 1976, vol. 3, 802–814.
Caplus Abstract of Dimcev, "Demulsification of Used Mineral Oil/Water Emulsions," Schmierungstechnik (1981) 12(6) 183–185.
Caplus Abstract of Vygorovskii, et al., "Properties of Petroleum Recovered by Thermal Alkali Flooding," Probl. Khim. Nefti (1992) 164–169.
Caplus Abstract of CS 171337 (Feb. 15, 1978).
Caplus Abstract of DD 129217 (Jan. 4, 1978).
Caplus Abstact of FR 2098884 (Apr. 14, 1972).
Caplus Abstract of JP 49111874 (Oct. 24, 1974).
Caplus Abstract of JP 50159880 (Dec. 24, 1975).
Caplus Abstract of 51030585 (Mar. 15, 1976).
Derwent WPI Abstract of CA 1223791 (Jul 7, 1987).
Derwent WPI Abstract of DD 76–467 (1971).
Derwent WPI Abstract of DD 129217 (Jan. 4, 1978) (Application No. 77–196986).
Derwent WPI Abstract of DD 291 568 (Jul. 4, 1991).
Derwent WPI Abstract of FR 2 645 047 (Oct. 5, 1990).
Derwent WPI Abstract of JP 2071803 (Mar. 12, 1990).
Derwent WPI Abstract of JP 53098155 (Aug. 28, 1978).
Derwent WPI Abstract of JP 61020322 (May 21, 1986).
Derwent WPI Abstract of NL 6908734 (1970).

*Primary Examiner*—Walter D. Griffin
*Assistant Examiner*—Tam M. Nguyen
*Attorney, Agent, or Firm*—Henry H. Gibson; Howrey & Simon

[57] ABSTRACT

A process for removing water from heavy crude oil uses an inorganic salt which is a Group IA or Group IIA metal halide or nitrate salts. The crude oil is in the form of a water-in-oil emulsion with water content of 8% (by weight) or less. The salt is stirred into the crude oil. The resulting mixture is warmed. A water layer with added salts and an oil layer form. The salts are water soluble and settle out of the crude oil layer with the water.

36 Claims, No Drawings

6,007,702

PROCESS FOR REMOVING WATER FROM HEAVY CRUDE OIL

FIELD OF THE INVENTION

This invention relates to water separation processes at crude oil production facilities. Particularly, the invention relates to removing water from heavy crude oil when the water is in the form of a water-in-oil emulsion. More particularly, the invention relates to removing residual water from a heavy crude oil water-in-oil emulsion which is stable to gravity separation or centrifuging even when the emulsion is heated.

BACKGROUND OF THE INVENTION

Heavy crude oil is generally obtained from underground oil fields in combination with water. The water contains salts and other water soluble materials. At the production facility, the bulk of the water with dissolved salts is removed from the crude oil by gravity separation (i.e., settling) or by centrifuging. The emulsion might also be heated to 35–80° C. to facilitate water separation. Residual water of 8% or less generally remains.

Removing the residual water is particularly difficult for crude oils which form water-in-oil emulsions with very small water droplet size that are stabilized with certain crude oil components. The problem is pronounced with heavy crude oils having API gravity of 30 or less, particularly those containing relatively high levels of natural surfactants, asphaltenes, and resin components. These components can stabilize water-in-oil emulsions, thereby making it more difficult to remove residual water from the emulsion.

API gravity is a measure of density defined by the American Petroleum Institute (API) as:

$$°API=[141.5/\text{specific gravity}]-131.5$$

where the specific gravity is measured at 60° F. API gravity is inversely proportional to density, i.e., the higher the API gravity the lower the density. Water has an API gravity of 10. Crude oil is generally less dense than water, with API gravity ranging from about 10 to about 60. Some heavy crudes have API gravity of less than 10, i.e., they are more dense than water.

Immiscible materials are more difficult to separate if their densities are similar. Consequently, separation of a water-in-oil emulsion is more difficult with a crude oil of API gravity in the lower half of the range, since the density of the oil approaches that of water.

RELATED ART

Known methods for removing residual water from crude oil emulsions have limitations. Generally, demulsifiers or emulsion breakers are added, or special equipment is required. In some cases, heating to temperatures between 35 and 80° C. will facilitate separation.

Chemical demulsifiers are used to destabilize and break crude oil emulsions. Chemical demulsifier performance is often unpredictable, and depends on the specific crude oil, the pH of the water phase, and the warming temperature. Chemical demulsifiers are generally high molecular weight polymers. Commonly used demulsifiers include fatty acid esters, ethylene oxide/propylene oxide block copolymers, polyglycol esters, bisphenol glycol ethers, glycol resin esters, polyamines, and alkyl or aryl sulfonic acids and sulfonates.

The water-in-oil emulsion may be heated above 80° C., but water separation may still be too slow. Heating to above the boiling point of water (100° C.) has also been considered, but the system must be maintained under pressure, which requires special apparatus.

In U.S. Pat. No. 4,551,239, a demulsifier formulation is described including a polyhydric alcohol de-oiler, an oxyalkylated alkyl-phenol formaldehyde demulsifier, and a co-solvent. These added materials increase the cost of water separation and refining and may complicate subsequent refining processes.

U.S. Pat. No. 4,466,885 discloses a method of dewatering and desalting heavy crude oil by adding metal ammonium monosulfides and hydrosulfides. This method is hampered by the requirement that pH be carefully controlled.

Canadian Patent No. 1,223,791 discloses breaking a water-in-oil crude oil emulsion by adding a conventional demulsifier, then injecting the mixture through a vortex chamber. Shear stresses disrupt the water/oil interfacial film without changing particle size. This process requires special equipment and crude oil of relatively low viscosity.

Inorganic salts have been used in processes for breaking oil-in-water emulsions. JP2-71,803; JP61 20,322; DD77-196,986. The oil-in-water emulsions are typically lubricating or machine oils dispersed in wastewater. However water is the continuous phase in such oil-in-water emulsions, whereas water is the dispersed phase in water-in-oil emulsions such as the heavy crude oils processed by the present invention. Since inorganic salts are soluble in the water phase but insoluble in the oil phase, adding an inorganic salt to an oil-in-water emulsion immediately puts the salt in contact with a phase in which the salt is soluble. The salt is thus readily distributed throughout the phase. But in a water-in-oil emulsion the added salt is immediately put in contact with the oil phase, in which the salt is insoluble. The dispersed water phase is relatively inaccessible to the added salt. It is therefore entirely surprising that adding a solid inorganic salt to a water-in-oil emulsion results in effective separation of water and oil phases.

SUMMARY OF THE INVENTION

The present invention is directed to a process for separating residual water from a crude oil which is a water-in-oil emulsion. In the process of the invention, an inorganic salt, preferably a water soluble inorganic salt, is added to the crude oil containing residual water. The inorganic salt may be an inorganic salt of the formula $MX_y$, wherein M may be any Group IA or Group IIA metal, e.g., Li, Na, K, Rb, Cs, Fr, Be, Mg, Ca, Sr, Ba, or Ra; X is a Group VIIA halide, e.g., F, Cl, Br, I, or At, or X is a nitrate anion ($NO_3$); and y is 1 or 2. The inorganic salt is distributed through the crude oil. The system is warmed. A water layer eventually separates along with the solubilized salt.

The invention is surprising, since it involves adding the very salts which known processes seek to remove. Inorganic salts, e.g., sodium chloride, calcium chloride and magnesium chloride, occur naturally in crude oil before dewatering and desalting. To date, skilled artisans have had no motivation to add such salts. In contrast, efforts have been directed towards developing methods of removing these salts to avoid potential harm to refinery processes.

FEATURES AND ADVANTAGES

The present invention has a number of features and advantages which distinguish it over conventional processes.

One advantage of this invention is that it provides effective removal of residual water from crude oil without adding demulsifiers.

Another advantage of this invention is that it does not require heating to above the boiling point of water. This allows residual water removal below the boiling point of water, simplifying the process and reducing costs.

Still another advantage of this invention is in using a relatively inexpensive additive, a Group IA or Group IIA halide or nitrate salt.

Still another advantage of this invention is that it provides crude oil with BS&W (basic sediments and water) values of 1.0% (by weight) or less. Ideally, the process will provide BS&W values of 0.5% or less, or even 0.1% or less. BS&W values represent residue remaining after dissolving the crude oil in toluene, also referred to as toluene-insoluble materials.

Still another advantage is that it provides a method of removing residual water from heavy crude oils produced in the North Sea, South America, and other parts of the world.

Still another advantage of this invention is that it provides a product suitable for direct use as fuel, e.g., bunker fuel, heating fuel, or power generation fuel. In particular, the product may be used for Bunker C fuel.

Additional features and advantages of the present invention will become apparent from the following description, and may be realized by means of the instrumentalities and combinations particularly pointed out in the appended claims.

DETAILED DESCRIPTION OF THE PREFERRED EMBODIMENTS

Overview

Bulk water separation from the heavy crude oil as it emerges from the well is carried out using an apparatus for gravity separation or a centrifuge. Standard oil field equipment may be used, e.g., a gravity settling/residence time tank, a horizontal skimmer, a free-water knockout tank or drum, a vertical separator, a gun barrel, or a heater treater. These are available from manufacturers such as Smith Industries, Inc. (Houston, Tex.) and C.E. Natco, Inc. (Tulsa, Okla.). Suitable centrifuges are available from manufacturers such as Alpha Laval Sharples (Houston, Tex.). Gravity settling or centrifuging for bulk separation will yield a heavy crude oil suitable for removal of residual water by the process of the present invention.

Preferably, the heavy crude oil obtained from bulk water separation is treated by the process of the present invention using equipment similar to that used for the bulk separation, e.g., a tank or centrifuge. The tank or centrifuge is modified with a device for adding the inorganic salt and a device for distributing the salt through the heavy crude oil. The device for adding the salt may be an Auger type gravity metering device, or equipment of the type used to spread road salt or fertilizer. The latter contains a hopper which dispenses a powder (here, the inorganic salt) on a rotating device with paddles to propel the particles such that they are deposited on a surface. For the present invention, the hopper would contain the inorganic salt and the paddles would effectively spread the salt over the heavy crude oil. Suitably modified tanks or centrifuges can be readily constructed by equipment manufacturers such as Smith Industries, C.E. Natco, and Alpha Laval Sharples.

As stated above, the invention may be implemented using an inorganic salt $MX_y$, wherein M may be any Group IA or Group IIA metal, e.g., Li, Na, K, Rb, Cs, Fr, Be, Mg, Ca, Sr, Ba, or Ra; X is a Group VIIA halide, e.g., F, Cl, Br, I, or At, or X is a nitrate anion ($NO_3$); and y is 1 or 2. Preferably, M is Na, K, Mg, Ca, or Ba and X is Cl or Br. More preferably, the salt is sodium chloride or calcium chloride. Commercially available salts are suitable. Particle size is not critical to the present invention, e.g., water separation is effective with the particle sizes found in commercial grade calcium chloride. It is generally not necessary to limit the particle size of the salt. The salt is preferably water soluble, having solubility in water of at least 1% by weight, more preferably at least 10% by weight, even more preferably at least 50% by weight.

The crude oil preferably has an API gravity of about 30 or less. The present invention is particularly useful for heavy crude oils, which have API gravity of about 25 or less, or even about 18 or less. The process is suitable for heavy crude oils having a total content of resins and asphaltenes of about 5% to about 30%. Heavy crudes generally have total resins and asphaltenes content of about 10% to about 25%. Asphaltenes and resins are petroleum components that are well known in the art.

The crude oil after bulk water separation preferably has a water content of about 8% (by weight) or less, preferably about 5% or less, more preferably about 2% or less, even more preferably about 1.5% or less. This water level may be achieved from crudes with high water content by settling or centrifuging. The water in the crude is of relatively low salinity, preferably 60,000 ppm or less total dissolved salts, more preferably 40,000 ppm or less, even more preferably 35,000 ppm or less. The units ppm are in $mg/10^6$ mL. Preferably, at least 80% of the water droplets have diameters in the range of 1–100 $\mu$m, more preferably 5–60 $\mu$m, even more preferably 10–30 $\mu$m.

The inorganic salt is preferably added as a solid, free-flowing powder. The salt is preferably added to the heavy crude oil in a weight ratio of between about 1:25 to about 1:500, more preferably about 1:100 to about 1:150.

The distribution of the inorganic salt in the crude oil results in a homogenous or non-homogenous mixture of the inorganic salt in the crude oil. A variety of stirring or mixing means can be used. The mixture of crude oil and salt may be manually stirred using a stirring rod or a spatula. The mixture may also be stirred using any of a variety of mechanical stirring devices, e.g., a static mixer, a beater mixer or pumping in and out of a vessel. Preferably, shearing should be minimized during the mixing step or in crude oil intended for the water separation process of the present invention. Shearing occurs by action of mechanical devices, e.g., rotating propeller blades, and sudden pressure drops due to restrictions in flowlines, or any other source of high turbulence. Shearing reduces water droplet size. In general, the smaller the water droplets in the water-in-oil emulsion, the more difficult the separation.

The warming step is not limited to any particular heating method. Suitable methods for heating the mixture in a container include placing the container an oven, surrounding the container with heating fluids, or exposing the mixture to any other source of heat, e.g., steam coils, a heat exchanger, or a fire tube/heater treater. Generally, the mixture need not be heated above 100° C. Preferably, the mixture is heated to a temperature of between about room temperature and about 100° C., more preferably between about 35° C. and about 95° C., even more preferably between about 45° C. to about 90° C. Warming to the boiling point of water (100° C.) or higher is possible but would require redesigning the separation equipment to handle the higher pressures generated, or would require zone heating to prevent pressure buildup. In certain circumstances direct application of heat may not be required after the step of distributing the inorganic salt through the heavy crude oil, e.g., if the heavy crude oil is already at an elevated temperature at the point of adding the inorganic salt. For example, the crude oil may emerge from a bulk water removal process at an elevated temperature.

The heating period is continued until separation no longer occurs at a significant rate, preferably less than 48 hours, more preferably less than 24 hours. In general, shorter heating periods are preferred. Higher temperatures tend to shorten the required heating time.

Residual salt will separate from the oil along with the water. In most cases, the salt will become soluble in the water and can be drained from the settling vessel as the salt solution. If necessary, any salt remaining in the oil may be removed by gravity separation.

The oil layer will preferably have a basic sediments & water (BS&W) value of about 1.0% (by weight) or less, preferably 0.5% or less, more preferably 0.1% or less. With minor experimentation, it is possible for a skilled artisan to achieve BS&W values of about 0.05% or less. BS&W values are determined by dissolving a sample of the oil in toluene and centrifuging or filtering the resulting mixture.

Tests have shown that the process of the present invention provides better water separation at 60° C. than the use of a commercial demulsifier. The process of the present invention using the inorganic salt, calcium chloride, was compared to the commercial demulsifier TROS95/98 (TR Oil Services, Aberdeen, UK) in separating water from a North Sea oil containing 5.8% (by weight) water in the form of a water-in-oil emulsion. Calcium chloride proved much more effective than the commercial demulsifier, even after only one day. Calcium chloride provided significant separation after one day. The commercial demulsifier achieved less separation after 7 days than the calcium chloride method of the present invention after one day. Note that the commercial demulsifier is recommended for use at high temperature. The tests showed that the commercial demulsifier is ineffective at lower temperatures. The present invention requires no demulsifier and is effective at lower temperatures, thus avoiding the cost of the demulsifier and any special equipment needed to accommodate higher temperature operation.

The process of the present invention can be carried out on an offshore platform for direct transfer to a ship, e.g., a tanker. In this embodiment, added weight on the platform is minimized by using a centrifuge mounted on the platform for bulk separation. A centrifuge adds less weight than a tank. As the heavy crude oil exits the centrifuge the heavy crude oil is fed directly to an on-board tank within the ship. During the transfer from the centrifuge to the ship, an inorganic salt is added to the heavy crude oil stream. The inorganic salt is then distributed through the heavy crude oil stream so that the stream enters the tank on the ship as a mixture of inorganic salt and heavy crude oil. The mixture may then be heated in the tank by heating coils. Such heating coils are generally available on board the ship. The residence time required for separation can be adjusted as necessary, and is only limited by the ship's transit time. If the resulting dried heavy crude oil is used as bunker fuel, the fuel is conveniently available to the ship.

The process of the present invention can be carried out at a production facility on land. In this embodiment, a first tank is used for bulk separation. In series, a second tank for the process of removing residual water is connected in the stream. A standard tank of the type used for bulk water separation is modified with a device for introducing the inorganic salt, and a device for mixing. The heavy crude oil exiting the second tank may be thinned or diluted for pipeline transport by adding a suitable amount of cutting stock, e.g., kerosene.

The present invention may be carried out on small or large scale. Anywhere from several barrels to over 100,000 barrels per day may be processed. Typically, 1,000 to 75,000 barrels per day of heavy crude oil could be produced by the process of the present invention. Tanks used for the process may have capacities of about 1,000 to 10,000 barrels, preferably 2,000 to 7,000 barrels, for large scale operation. The process may be carried out in batch wise or continuous mode, preferably continuous mode using flow-through vessels.

An exemplary process is described in the following Example. After reading this description, it will become apparent to a person skilled in the art how to implement the invention by varying the amount of salt, the method of mixing, and the warming temperature.

EXAMPLE

Calcium chloride (1.0 g) was added as a granular salt to North Sea crude (100 g). The North Sea crude contained 1.2% (by weight) water. The calcium chloride was spread over the crude at room temperature. The mixture was stirred with a stirring rod for a few seconds. The mixture was put in an oven at 65° C. Within an hour water separation was visible. No further water separation was noticeable after 4 hours. The mixture was left in the oven for 22 hours. BS&W was 0.5% (by weight).

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of separating water from heavy crude oil, comprising the steps of:
    a) adding an inorganic salt to heavy crude oil, wherein the inorganic salt is a solid and the heavy crude oil is a water-in-oil emulsion;
    b) distributing the inorganic salt through the heavy crude oil;
    c) warming the crude oil containing the inorganic salt to a temperature of between about room temperature and about 100° C.; and
    d) separating a dried heavy crude oil layer from a water layer with the salt.

2. The method of claim 1, wherein the heavy crude oil is the product of an initial bulk water separation process.

3. The method of claim 1, wherein the heavy crude oil initially contains about 8% (by weight) water or less.

4. The method of claim 1, wherein the heavy crude oil initially has an API gravity of about 30 or less.

5. The method of claim 1, wherein the salt has the formula $MX_y$, wherein
    i) M is a Group IA or Group IIA metal,
    ii) X is a Group VIIA halide or nitrate anion, and
    iii) y is 1 or 2.

6. The method of claim 1, wherein the salt is NaCl or $CaCl_2$.

7. The method of claim 1, wherein the salt is added to the heavy crude oil in a weight ratio of between about 1:25 to about 1:500.

8. The method of claim 1, wherein the salt is water soluble.

9. The method of claim 1, further comprising the step of:
    e) allowing salt to settle from the dried heavy crude oil layer by gravity separation.

10. A method of processing bulk volumes of heavy crude oil to remove water, comprising the steps of:
   a) adding an inorganic salt to at least about 1,000 barrels of heavy crude oil, wherein the inorganic salt is a solid and the heavy crude oil is a water-in-oil emulsion;
   b) distributing the inorganic salt through the crude oil;
   c) warming the crude oil containing the inorganic salt to a temperature of between about room temperature and about 100° C.; and
   d) separating a dried heavy crude oil layer from a water layer with the salt.

11. The method of claim 10, wherein the heavy crude oil is the product of an initial bulk water separation process.

12. The method of claim 10, wherein the heavy crude oil initially contains about 8% (by weight) water or less.

13. The method of claim 10, wherein the heavy crude oil initially has an API gravity of about 30 or less.

14. The method of claim 10, wherein the salt has the formula $MX_y$, wherein
   i) M is a Group IA or Group IIA metal,
   ii) X is a Group VIIA halide or nitrate anion, and
   iii) y is 1 or 2.

15. The method of claim 10, wherein the salt is NaCl or $CaCl_2$.

16. The method of claim 10, wherein the salt is added to the heavy crude oil in a weight ratio of between about 1:25 to about 1:500.

17. The method of claim 10, wherein the salt is water soluble.

18. The method of claim 10, further comprising the step of:
   e) allowing salt to settle from the dried heavy crude oil layer by gravity separation.

19. A method for generating heat or power, comprising the step of burning a fuel, wherein the fuel is prepared by a process comprising the steps of:
   a) adding an inorganic salt to heavy crude oil, wherein the inorganic salt is a solid and the heavy crude oil is a water-in-oil emulsion
   b) distributing the inorganic salt through the crude oil;
   c) warming the mixture to a temperature of between about room temperature and about 100° C.; and
   d) separating a dried heavy crude oil layer from a water layer with the salt to form the fuel.

20. The method of claim 19, wherein the heavy crude oil is the product of an initial bulk water separation process.

21. The method of claim 19, wherein the heavy crude oil initially contains about 8% (by weight) water or less.

22. The method of claim 19, wherein the heavy crude oil initially has an API gravity of about 30 or less.

23. The method of claim 19, wherein the salt has the formula $MX_y$, wherein
   i) M is a Group IA or Group IIA metal,
   ii) X is a Group VIIA halide or nitrate anion, and
   iii) y is 1 or 2.

24. The method of claim 19, wherein the salt is NaCl or $CaCl_2$.

25. The method of claim 19, wherein the salt is added to the heavy crude oil in a weight ratio of between about 1:25 to about 1:500.

26. The method of claim 19, wherein the salt is water soluble.

27. The method of claim 19, further comprising the step of:
   e) allowing salt to settle from the dried heavy crude oil layer by gravity separation.

28. A petroleum fuel, prepared by a process comprising the steps of:
   a) adding an inorganic salt to heavy crude oil, wherein the inorganic salt is a solid and the heavy crude oil is a water-in-oil emulsion
   b) distributing the inorganic salt through the heavy crude oil;
   c) warming the heavy crude oil containing the inorganic salt to a temperature of between about room temperature and about 100° C.; and
   d) separating a dried heavy crude oil layer from a water layer with the salt.

29. The petroleum fuel of claim 28, wherein the heavy crude oil is the product of an initial bulk water separation process.

30. The petroleum fuel of claim 28, wherein the heavy crude oil initially contains about 8% (by weight) water or less.

31. The petroleum fuel of claim 28, wherein the heavy crude oil initially has an API gravity of about 30 or less.

32. The petroleum fuel of claim 28, wherein the salt has the formula $MX_y$, wherein
   i) M is a Group IA or Group IIA metal,
   ii) X is a Group VIIA halide or nitrate anion, and
   iii) y is 1 or 2.

33. The petroleum fuel of claim 28, wherein the salt is NaCl or $CaCl_2$.

34. The petroleum fuel of claim 28, wherein the salt is added to the heavy crude oil in a weight ratio of between about 1:25 to about 1:500.

35. The petroleum fuel of claim 28, wherein the salt is water soluble.

36. The petroleum fuel of claim 28, wherein the process further comprises the step of:
   e) allowing salt to settle from the dried heavy crude oil layer by gravity separation.

* * * * *